March 18, 1930.  W. J. MILLER  1,750,762
JIGGER FOR USE IN THE MANUFACTURE OF ARTICLES FROM PLASTIC MATERIALS
Filed Oct. 25, 1926
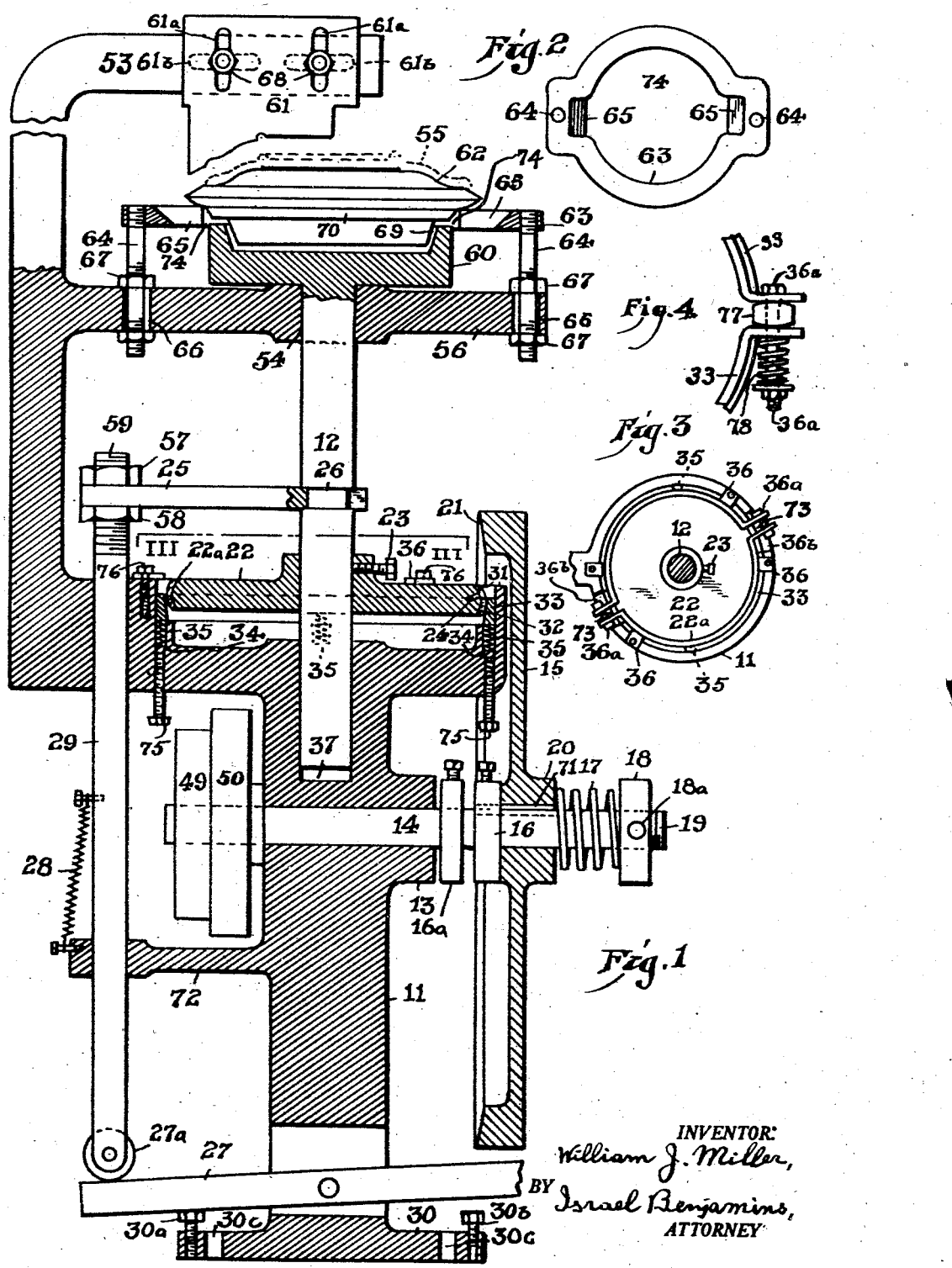
INVENTOR:
William J. Miller,
BY Israel Benjamins,
ATTORNEY Patented Mar. 18, 1930

1,750,762

UNITED STATES PATENT OFFICE

WILLIAM J. MILLER, OF SWISSVALE, PENNSYLVANIA

JIGGER FOR USE IN THE MANUFACTURE OF ARTICLES FROM PLASTIC MATERIALS

Application filed October 25, 1926. Serial No. 143,994.

My invention relates to improvements in jiggers for use in the manufacture of articles from plastic materials, and it consists in the novel features, which are hereinafter described.

One of the objects of my improvement is to prevent wear of the moulds, due to friction of the chuck of the jigger thereon when inserting the mold into the said chuck and when removing it therefrom. Another object of my improvement is to facilitate the insertion and removal of the mold.

A further object of my improvement is to save time and labor in operating the jigger. Another object of my improvement is to have the profile stationary and the mold brought up to it during the operation of the jigger, thereby releasing the hand of the operator, which is otherwise employed in manipulating the profile, also to employ this reciprocating motion to assist in releasing the mold from the chuck.

A still other object is to have the mold automatically loosened from the chuck of the jigger preliminary to having it removed therefrom.

A still further object is to have my improved jigger simple, durable and inexpensive.

Other objects and advantages will hereinafter appear.

I attain these objects by the mechanism, one form of which is illustrated in the accompanying drawings, or by any mechanical equivalent or obvious modification of the same.

In the drawings Fig. 1 is a central vertical section of one form of my improved jigger, showing the foot lever, which is hereinafter described, with its treadle broken away, also showing the jigger spindle and sundry other parts in elevation, and showing the material on the mold in dotted lines.

Fig. 2 is a detail plan view on a reduced scale of the mold supporting or intercepting plate, which is hereinafter more fully described; Fig. 3 is a detail plan view on a reduced scale of the band brake, which is hereinafter described, with parts of the jigger which are adjacent thereto, and Fig. 4 is a fragmentary detail view of the pressure adjusting spring and filler block of said brake 33, which are hereinafter more fully described.

Like numerals refer to like parts throughout the several views.

11 designates the frame or stationary support of a jigger spindle 12, which terminates at its upper end in a chuck 60, to support a mold 62 with material 55 thereon under a stationary profile 61, which is shown as having therein vertical slots 61$^a$ and is adjustably secured to an extension 53 of said frame 11 by means of screws 68; the extension 53 has therein horizontal slots 61$^b$ to cooperate with the slots 61$^a$ of the profile 61, to permit adjustment of the position of said profile 61 in all directions in the plane thereof.

The upper end of the spindle 12 slides in a socket 54 in an extension 56 of said frame 11, which extension also serves as a support for a mold supporting or intercepting plate, which is hereinafter described.

A bearing 13 is shown as formed in said frame 11 for a horizontal shaft 14, which may be connected to a source of power, such as a motor or line shaft, by means of stepped pulleys 49 and 50, which are secured to said shaft 14.

A friction gear 15 is slidably mounted on said shaft 14 by means of a spline 71, and is kept in position in contact with a gear 22, which is hereinafter described, by means of a compression spring 17, which is abutting at its outer end against a nut 18, which is adjustably positioned on a threaded portion 19 of said shaft 14, and has therein a hole 18$^a$ for the insertion of a pin for turning said nut 18 on said threaded portion 19. A collar 16 on said shaft 14 limits the motion of said gear 15 on said shaft 14 and fixes its extreme position thereon; another collar 16ᵃ serves to prevent the horizontal displacement of said shaft 14. The nut 18 serves to adjust the pressure of the spring 17 on the hub 20 at the rear of said gear 15.

The working face 21 of said gear 15 is shown as tapering inwardly, for the purpose, which is hereinafter described.

The spindle 12 is shown as having mounted thereon a friction gear 22, which may be adjustably secured thereto by means of a suitable set screw 23; said gear 22 is to be engaged by said face 21 of the gear 15.

A facing 22ᵃ of leather or any other suitable material may be secured to the upper part of the periphery 24 of said gear 22, to increase the friction thereof when in contact with said face 21. A similar facing is secured to the lower part of said periphery 24, for the purpose hereinafter described.

A fork 25 is swivelled on a neck 26 on said spindle 12, whereby said spindle may be raised and lowered.

A tensile spring 28 is shown as secured at one end thereof to an extension 72 of said frame 11 and at the other end thereof to a pitman or vertical rod 29, which carries said fork 25, thereby tending to draw said fork downwardly, and said vertical rod 29 is slidably mounted in the frame 11 and the extension 72 thereof and adjustably connected to said fork 25, and it has at its lower end a roll 27ᵃ, to be acted on by a lever 27, whereby the rod 29 may be raised and lowered, thereby raising and lowering the fork 25 and the spindle 12.

Nuts 57 and 58 on a threaded portion 59 of said rod 29 permit the adjustment of said spindle 12 with the chuck 60, which is hereinafter described, vertically by means of said fork 25.

A flange or floor plate 30 is shown at the lower end of said frame 11, for pivotally connecting said lever 27 to the frame 11; screws 30ᵃ and 30ᵇ on said plate 30 limit the motion of the lever 27 in either direction, and bolt holes 30ᶜ are provided in said floor plate 30, for securing the same to the floor by bolts or screws. The length of the stroke of said spindle 12 and the position thereof may be varied by varying the amplitude of said lever 27 by means of said screws 30ᵃ and 30ᵇ. By adjusting the screw 30ᵇ, the highest point of reciprocation of the spindle 12 and chuck 60 may be limited or adjusted without affecting the lowest point of reciprocation thereof, and by adjusting the screw 30ᵃ, the lowest point of reciprocation of said spindle and chuck may be adjusted or limited without affecting the highest point of reciprocation thereof, and either or both of the foregoing adjustments may be made without affecting the vertical adjustment of said spindle by the nuts 57 and 58 on the rod 29, and vice versa.

The periphery 24 of said gear 22 is shown as having thereon two adjacent friction surfaces, to wit: an upper surface 31, to engage said face 21 of said gear 15, and a lower surface 32 to fit the surface of a band brake 33, which is shown as mounted in a circular recess in said frame 11 opposite the lower part of said gear 22 and resting on springs 35 in circular pockets 34 in said frame 11; the springs 35 tend to lift the brake 33.

Screws 75 are provided for adjusting the pressure on said springs 35 under said brake 33.

Plates 36 are provided on said frame 11, to limit the lift of said brake 33. The position of the plates 36 may be adjusted vertically by means of the screws 76.

Bolts 36ᵃ are provided, to secure the flanges of the sections of the brake 33 to each other and springs 73 between the flanges, tending to spread the flanges apart. I prefer to place a filler block 77 between one pair of the flanges of said brake 33, as shown in Fig. 4 of the drawings, to replace the spring 73, and to place another compression spring 78 between one of said pair of flanges and the head or nut of the corresponding bolt 36ᵃ, said spring 78 is to adjust the pressure of the brake 33 on the gear 22; the diameter of the brake may then be adjusted for wear by the other of said bolts 36ᵃ against the pressure of the spring 73, which is situated between the other pair of flanges, as shown in Fig. 3. Slots 36ᵇ are provided in the frame 11, as shown in Fig. 3, for said flanges to slide therein, when said brake 33 is lifted by said springs 35, thereby preventing rotation of the brake 33 on said frame 11.

A horizontal mold supporting member or intercepting plate 63, which has therein a central opening 74, is adjustably connected to an extension 56 of said frame 11 by means of bolts 64, passing through enlarged openings 66 in said extension 56, and nuts 67, to intercept the mold 62 when the spindle 12 is lowered, thereby separating said mold from the chuck 60 of said spindle 12, after the operation of profiling is completed and to support said mould 62 thereon after separating it from said chuck 60 until it is removed by the operator. The openings 66 permit said plate 63 to be adjusted in all directions by means of said bolts 64, and each bolt may be adjusted independently of the other when necessary.

The plate 63 has therein tapered recesses or openings 65 for facilitating the removal of the moulds therefrom.

A clearance 69 is provided between the edge of the opening 74 in said plate 63 and the periphery of the mold 62 to permit the placing of the mold 62 thereinto when the plate 63 is slightly displaced.

An annular bead 70 is also provided on the underside of the mold 62, to prevent displacement of the same on said plate 63.

The operation of this form of my improved jigger is as follows:—

The jigger spindle 12 is normally raised from the pivot bearing 37 on said frame 11 and is supported in position by said brake 33, which is in contact wtih the lower friction surface 32 of said periphery 24; the spindle 12 is then stationary, with the chuck 60 thereof below the intercepting plate 63; the mold 62 is then deposited into the plate 63, with a proper charge of material 55 thereon, whereupon the operator steps upon the lever 27, thereby raising the spindle 12 with the chuck 60, thereby raising the mold 62 off the plate 63, thereby also raising the gear 22 until the upper friction surface 31 of the periphery 24 comes into contact with said face 21 of the gear 15, which is in rotary motion, where by rotary motion is also gradually imparted to the spindle 12, at first gently as the surface 31 is opposite the inner end of the face 21, which has a shorter radius than the other end thereof, when there is little pressure therebetween, permitting relative slipping; as the spindle 12 with the gear 22 is being further raised by the operator, the pressure between said surface 31 and the face 21 increases by virtue of the taper of said face 21 as shown, thereby gradually increasing the velocity of said spindle 12, until its highest velocity is attained when the chuck 60 with the mold 62 and the material 55 thereon is brought into operative position under said profile 61; there is practically no slipping then between said surface 31 and said face 21. The material 55 is then given the shape of the required article by the coaction of the profile and the rotating mold 62.

The variation in the rotary speed of the spindle 12 is accomplished partly by the stepped pulleys 49 and 50, partly by the variation of the distance of said gear 22 from the shaft 12 and also to a large extent by varying the amount of slipping between said surface 31 and said face 21 by means of the internal taper of said face 21, as is hereinbefore described.

The leather or other resilient facing 22* assists in securing a firmer grip between said surface 31 and said face 21 and also, by means of its resilience, it helps to transmit motion at the lower speeds of said spindle 12, when said surface 31 is opposite the inner end of said face 21.

The pressure between the said gears 22 and 15 is controlled by the spring 17, as is hereinbefore described, and the collar 16 on the shaft 14 is provided to prevent the gear 15 from excessively overlapping the gear 22.

A belt may be employed to connect said pulleys 49 and 50 to a source of power.

The position of the gear 22 on the spindle 12 may be so adjusted that, when the spindle 12 is raised, the surface 32 of the periphery 24 will first get clear out of contact with the brake 33 and then move some distance vertically before the surface 31 will come into contact with the face 21 of the gear 15, thereby allowing a short interval between brake action and rotation, thereby allowing more time for the replacement of the successive molds 62 on the plate 63 before rotation of the chuck 60 begins, when the newly placed mold is promptly brought under the profile 61.

The springs 35 under the brake 33 serve to advance the action between the brake 33 and the gear 22, when the latter is lowered with the spindle 12, to stop the rotation of the latter before the mold 62 is intercepted by the plate 63, to prevent wearing of the mold 62 on the said plate 63.

My improved jigger may be modified by making the profile rotary and the mold reciprocating on a reciprocating rod or column or both the spindle and the profile may have rotary motion.

My jigger may also be modified to have only some of the features above described embodied therein without the others, for example: it may have intermittent rotation with gradual acceleration and retardation of the chuck 60 and mould 62 thereon to reduce the wear on the later without reciprocation of the motion thereof, or it may have reciprocal motion of the chuck and mold to cooperate with a suitable member for releasing the latter from the chuck, to facilitate handling of the mold, without intermittent rotation.

The mold may also be reciprocated otherwise than as above described. The intercepting plate 63 above described may also be used for purposes other than above described; the reciprocal motion of the chuck 60 may also be utilized for useful purposes other than above described.

The spindle 12 may also be omitted, and the chuck 60 actuated by other means or mechanisms, if desired.

Many other changes may be made in the details of my improved jigger without departing from the main scope of my invention, and parts of my invention may be used without other parts.

I do not, therefore, restrict myself to the details as shown, in the drawings, but I intend to include also all mechanical equivalents and obvious modifications of the same within the scope of my invention.

I claim as my invention and desire to secure by Letters Patent:

1. A pottery forming machine including a mold, a chuck for rotating the mold, means for automatically engaging and disengaging the chuck and mold, and means for stopping the rotation of the chuck before the mold is disengaged therefrom.

2. A pottery forming machine including a mold, a chuck for rotating the mold, means for automatically engaging and disengaging the chuck and mold, and a brake adjustable to halt the rotation of the chuck before the mold is disengaged therefrom.

3. A pottery forming machine including two members having relative vertical movement, a mold supported alternately by said members, means for rotating the mold when it is supported by one of said members, and a vertically adjustable friction brake for stopping the rotation of the mold before it is supported by the other of said members.

4. A pottery forming machine including a mold, a profile, means for moving the mold toward and from the profile, means for rotating the mold, and a friction brake adjustable to halt the rotation of the mold prior to the completion of its movement away from the profile.

5. A pottery forming machine including a mold, a profile, a support for the mold, means for moving the mold from said support toward the profile, means for starting the rotation of said mold after it has been moved from said support, and means for gradually accelerating the rotation of said mold.

6. A pottery forming machine including a spindle and a chuck adapted to support a mold, a friction gear carried by said spindle, friction driving means adapted to cooperate with the friction gear, and means for vertically moving said spindle and chuck, the friction drive being so constructed as to vary the velocity of rotation of said chuck in accordance with its vertical position.

7. A pottery forming machine including a spindle adapted to support a mold, means for rotating the spindle, means for vertically moving the spindle, and means for varying the speed of rotation of said spindle in accordance with its vertical position.

8. A pottery forming machine including a mold, means for rotating the mold, means for vertically moving the mold, and means for controlling the rotation of the mold in accordance with its vertical position.

9. A pottery forming machine including a mold, a support therefor, means for causing a relative substantially vertical movement between the mold and the support, means for causing a relative rotary movement between the mold and said support, the speed of said rotary movement being controlled by the vertical movement.

10. A pottery machine including a mold, a chuck for rotating the mold, a stationary support for the mold, means for raising and lowering the chuck to engage and disengage the mold, a friction drive for said chuck, and resilient means for varying the frictional contact of said drive.

11. A pottery machine including a mold, a chuck for rotating the mold, a support for the mold, means for raising and lowering the chuck to engage and disengage the mold, a friction gear wheel fixedly associated with said chuck, a driving wheel for cooperation with said friction gear, the arrangement of the parts being such that the friction gear and driving gear will become engaged or disengaged as the chuck is reciprocated, resilient means for pressing the driving wheel axially toward the friction gear, and an adjustable stop for limiting the axial movement of the driving wheel.

12. In a jigger of the class specified, a frame, a stationary mold supporting member thereon, a stationary profile member, a spindle terminating in a mold supporting chuck and adapted to be vertically reciprocated to bring a mold into and out of operative position relatively to the profile member, a drive shaft mounted in said frame at right angles to said spindle, and coacting, intermittently contacting friction gears adjustably secured on said spindle and said shaft, the gear on the drive shaft being continuously driven and the acting surface thereof tapered to gradually increase and decrease the frictional contact between said gears as the mold is moved into and out of operative position.

13. In a jigger of the class specified, a frame, an adjustable mold-supporting member thereon, a stationary profile member, a vertically reciprocable spindle terminating in a mold-supporting chuck, a friction gear adjustably secured on said spindle, a drive shaft mounted in said frame at right angles to said spindle, an adjustably and yieldingly mounted friction gear on said drive shaft the acting surface of which is tapered from the outer periphery of said gear inwardly toward the center thereof, and means for adjusting the vertical reciprocation of said spindle.

14. In a jigger of the class specified, a frame, a stationary profile thereon, a rotatably mounted spindle terminating in a mold-supporting chuck, a drive shaft, coacting, intermittently contacting friction gears on said spindle and said shaft, and means for imparting vertical reciprocation to said spindle comprising a pitman and cross fork connecting said pitman and spindle, said fork being adjustable on said pitman to adjust the altitude of reciprocation of said spindle.

15. In a jigger of the class specified, a frame, a stationarily mounted vertically and laterally adjustable profile member, a stationarily mounted vertically and laterally adjustable mold supporting plate, a vertically reciprocable spindle terminating in a mold-supporting chuck, means for reciprocating said spindle comprising a pitman and an adjustable cross fork connecting said pitman and spindle, and means for imparting gradually accelerated and decelerated rotation to said spindle during reciprocation thereof comprising intermittently contacting coacting friction gears, one of said gears being continuously driven and resiliently mounted and the acting surface thereof tapered to gradually increase and decrease the frictional contact between said gears simultaneously with the acceleration and deceleration of the speed of rotation.

WILLIAM J. MILLER.